(12) United States Patent
Balk et al.

(10) Patent No.: US 10,196,463 B2
(45) Date of Patent: Feb. 5, 2019

(54) METHOD FOR PRODUCING AN AQUEOUS POLYMER DISPERSION

(71) Applicant: BASF SE, Ludwigshafen (DE)

(72) Inventors: Roelof Balk, Boehl-Iggelheim (DE); Bastiaan Lohmeijer, Mannheim (DE)

(73) Assignee: BASF SE, Ludwigshafen (DE)

( * ) Notice: Subject to any disclaimer, the term of this patent is extended or adjusted under 35 U.S.C. 154(b) by 81 days.

(21) Appl. No.: 15/523,800

(22) PCT Filed: Nov. 3, 2015

(86) PCT No.: PCT/EP2015/075573
§ 371 (c)(1),
(2) Date: May 2, 2017

(87) PCT Pub. No.: WO2016/071326
PCT Pub. Date: May 12, 2016

(65) Prior Publication Data
US 2018/0305471 A1    Oct. 25, 2018

(30) Foreign Application Priority Data
Nov. 4, 2014   (EP) .................................... 14191732

(51) Int. Cl.
| | | |
|---|---|---|
| *C08F 2/22* | (2006.01) | |
| *C08F 265/06* | (2006.01) | |
| *C08F 290/14* | (2006.01) | |
| *C08F 2/46* | (2006.01) | |
| *C08F 2/24* | (2006.01) | |
| *C09D 133/10* | (2006.01) | |
| *C09J 121/02* | (2006.01) | |
| *C09J 151/06* | (2006.01) | |
| *C09D 15/00* | (2006.01) | |
| *C09D 133/14* | (2006.01) | |
| *C08F 2/26* | (2006.01) | |
| *C08F 220/14* | (2006.01) | |
| *C08F 6/20* | (2006.01) | |
| *C09D 151/00* | (2006.01) | |

(52) U.S. Cl.
CPC .................. *C08F 2/26* (2013.01); *C08F 6/20* (2013.01); *C08F 220/14* (2013.01); *C08F 265/06* (2013.01); *C09D 151/003* (2013.01)

(58) Field of Classification Search
CPC ........ C08F 265/06; C08F 290/14; C08F 2/24; C08F 220/18; C08F 2/46; C09D 5/00; C09D 151/00; C09D 4/00; C09D 5/02; C09D 133/06; C09D 167/08; C09D 133/10
See application file for complete search history.

(56) References Cited

U.S. PATENT DOCUMENTS

| | | | |
|---|---|---|---|
| 4,269,749 A | 5/1981 | Marriott et al. | |
| 4,654,397 A | 3/1987 | Mueller-Mall et al. | |
| 5,744,540 A | 4/1998 | Baumstark et al. | |
| 6,005,042 A | 12/1999 | Désor et al. | |
| 9,150,732 B2* | 10/2015 | Balk | C08F 2/24 |
| 9,567,484 B2* | 2/2017 | Roller | C09D 133/08 |
| 2010/0204394 A1 | 8/2010 | Balk et al. | |
| 2012/0077030 A1* | 3/2012 | Gerst | C08F 265/02 |
| | | | 428/355 AC |
| 2012/0252972 A1* | 10/2012 | Balk | C08F 2/22 |
| | | | 524/809 |
| 2017/0275407 A1* | 9/2017 | Balk | C08F 2/26 |

FOREIGN PATENT DOCUMENTS

| | | |
|---|---|---|
| DE | 40 03 422 A1 | 8/1991 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 184 091 A2 | 6/1986 |
| EP | 0 623 659 A2 | 11/1994 |
| EP | 0 710 680 A2 | 5/1996 |
| EP | 0 771 328 | 5/1997 |
| EP | 0 795 568 A2 | 9/1997 |
| EP | 0 771 328 B1 | 10/1998 |
| WO | 95/33775 A1 | 12/1995 |
| WO | 2008/152017 A1 | 12/2008 |
| WO | 2009/095569 A1 | 8/2009 |

OTHER PUBLICATIONS

International Search Report dated Jan. 5, 2016 in PCT/EP2015/075573 filed Nov. 3, 2015.
European Search Report dated Apr. 23, 2015 in European Application 14191732.8 filed Nov. 4, 2014.
International Preliminary Report on Patentability and Written Opinion dated May 18, 2017 in PCT/EP2015/075573 (English language translation only).
U.S. Appl. No. 15/512,303, filed Mar. 17, 2017, Roelof Balk et al.

* cited by examiner

*Primary Examiner* — Robert D. Harlan
(74) *Attorney, Agent, or Firm* — Oblon, McClelland, Maier & Neustadt, L.L.P.

(57) ABSTRACT

The present invention relates to a method for producing an aqueous polymer dispersion by radical-initiated aqueous emulsion polymerization of ethylenically unsaturated monomers, and to polymer dispersions obtainable according to said method. The invention also relates to the use of the said polymer dispersions, in particular for the production of coating products for wood.

17 Claims, No Drawings

METHOD FOR PRODUCING AN AQUEOUS POLYMER DISPERSION

The present invention relates to a process for producing an aqueous polymer dispersion by free-radically initiated aqueous emulsion polymerization of ethylenically unsaturated monomers and to the polymer dispersions obtainable by this process. The present invention also relates to the use of the polymer dispersions, especially for production of coating compositions for wood.

BACKGROUND OF THE INVENTION

Aqueous polymer dispersions produced by free-radically initiated aqueous emulsion polymerization, also referred to hereinafter as emulsion polymers, find various uses for production of coating compositions and adhesives, and as a binder for fibers and textiles.

When aqueous polymer dispersions are used for production of aqueous coating compositions such as emulsion paints and varnishes, it is often the case that properties achievable only by contrary measures are desirable. On the one hand, the polymer dispersions are to assure good film formation at low temperatures, even in the case of low proportions of filming auxiliaries, which typically entails a low glass transition temperature of the polymer. At the same time, a high hardness and scratch resistance of the dry film is required, which is typically assured only by means of comparatively hard polymers having a correspondingly high glass transition temperature, which form films only with difficulty, if at all, without filming auxiliaries.

There have been various proposals of multistage polymer latices, i.e. polymer dispersions of polymer particles composed of several polymer phases having different glass transition temperatures, for the production of wood coatings—see, for example, EP 184091, EP 623659 A1, EP 710680 A1 or EP 795568 A2. The multistage polymer latices are generally produced by a multistage emulsion polymerization in which the monomers which form the respective polymer phase are polymerized sequentially, i.e. in successive polymerization stages. Hereinafter, multistage polymer latices are therefore also referred to as multistage emulsion polymers. The multistage emulsion polymers described in the documents cited are suitable for pigmented wood paints and varnishes and feature good blocking resistance and in some cases also very low water sensitivity.

Even though it is possible to use the aforementioned multistage emulsion polymers as binders in coating systems for wood and wood-like substrates, certain disadvantages nevertheless arise, especially when they are formulated in pigmented or tinted wood paints. Thus, the aforementioned multistage emulsion polymers are incompatible with various pigment types frequently used in such color formulations, which is manifested in the formation of coagulate and filter residues in the course of production of the formulation, and by inadequate hue stability on application of the coating to the substrate. Furthermore, it is often possible only with difficulty to adjust the viscosity characteristics of the formulation, which are important for proper application of the paint to the substrate.

WO 2008/152017 describes the production of aqueous multistage emulsion polymers, in which an emulsion polymer is first prepared, formed exclusively from monomers having limited water solubility, and then two monomer compositions are polymerized onto it successively. The process allows control of the particle size of the polymer and gives emulsion polymers having good mechanical properties such as blocking resistance, which are manifested in pigment-containing paint formulations by good color brightness and color depth. However, hue stability is inadequate in some cases. Moreover, on application of the paint, leveling is disrupted, which leads to only moderate gloss of the dried paint film, which is problematic especially in the case of clearcoats.

WO 2009/095569 describes multistage emulsion polymers which are prepared by free-radical emulsion polymerization in the presence of phosphate emulsifiers. However, hue stability is likewise only inadequate, and leveling is likewise disrupted on application of the paint.

SUMMARY OF THE INVENTION

The problem addressed by the present invention is that of providing emulsion polymers which have the problems that occur in the prior art only to a small degree, if at all. More particularly, the emulsion polymers, in clearcoats and pigment-containing coating compositions, especially on application to wood, should have good hue stability and high gloss. In addition, the emulsion polymers, even at low temperatures and without the use of solvents and filming auxiliaries, should lead to coatings having high blocking resistance and good pendulum hardness combined with low elasticity and good water resistance. At the same time, the emulsion polymers in paint formulations should allow reproducible rheological adjustment. More particularly, the viscosity of the paints should be insensitive to variations in thickener concentration in the paint.

It has been found that, surprisingly, these and further objects are achieved by the aqueous polymer dispersions obtainable by the process for free-radical aqueous multistage emulsion polymerization defined in detail hereinafter, in which the first polymerization stage is conducted in the presence of an emulsion polymer formed from water-insoluble monomers, of at least one dispersant D1a having at least one sulfate or sulfonate group and of at least one second dispersant D1b having at least one phosphate or phosphonate group, and at least one dispersant D2b having at least one phosphate or phosphonate group is used in the second polymerization stage, wherein the weight ratio of the dispersant D1b used in the first stage to the dispersant D2b used in the second polymerization stage is <1 and is especially in the range from 1:1.01 to 1:5.00 and especially in the range from 1:1.05 to 1:4.00.

Accordingly, the invention relates firstly to a process for producing an aqueous polymer dispersion by free-radically initiated aqueous emulsion polymerization of ethylenically unsaturated monomers in the presence of at least one dispersant and at least one polymerization initiator, comprising the following steps:

i) provision of an aqueous polymer dispersion S formed essentially from uncharged, monoethylenically unsaturated monomers M0 having a low water solubility of less than 100 g/l at 20° C. and 1 bar;

ii) free-radical emulsion polymerization of a monomer composition M1 in the presence of a dispersant composition D1 and the aqueous polymer dispersion S, said monomer composition M1 comprising:

90% to 99.9% by weight, based on the total amount of monomers in the monomer composition M1, of at least one uncharged monoethylenically unsaturated monomer MA1 having a water solubility of less than 100 g/L at 20° C. and 1 bar; and 0.1% to 10% by weight, based on the total amount of monomers in the monomer composition M1, of at least one anionic or uncharged monoethylenically unsaturated monomer MB1 having a water solubility of at least 200 g/L at 20° C. and 1 bar;

and then iii) free-radical emulsion polymerization of a monomer composition M2 in the presence of a dispersant composition D2 in the aqueous polymer dispersion obtained in step ii), said monomer composition M2 comprising:

90% to 99.9% by weight, based on the total amount of monomers in the monomer composition M2, of at least one uncharged monoethylenically unsaturated monomer MA2 having a water solubility of less than 100 g/L at 20° C. and 1 bar; and 0.1% to 10% by weight, based on the total amount of monomers in the monomer composition M2, of at least one anionic or uncharged monoethylenically unsaturated monomer MB2 having a water solubility of at least 200 g/L at 20° C. and 1 bar;

with the following provisos:

the dispersant composition D1 comprises at least one first anionic dispersant D1a having at least one sulfate or sulfonate group, and optionally at least one second dispersant D1b having at least one phosphate or phosphonate group;

the dispersant composition D2 comprises at least one dispersant D2b having at least one phosphate or phosphonate group, and the weight ratio of the amount of dispersant D1b used in stage 1 to the amount of dispersant D2b used in stage 2, i.e. the D1b/D2b ratio, is less than 1 and is especially in the range from 1:1.01 to 1:5.00 and specifically in the range from 1:1.05 to 1:4.00.

The present invention accordingly also relates to aqueous polymer dispersions obtainable by the process described here and hereinafter, and to the polymer powders obtainable by drying, especially by spray- or freeze-drying of such aqueous polymer dispersions.

The present invention further relates to the use of the aqueous polymer dispersions described here and hereinafter for production of adhesives, sealants, synthetic renders, papercoating slips, fiber webs, paints and coatings compositions for organic substrates, and for modification of mineral binders. The present invention especially relates to the use of the aqueous polymer dispersions described here and hereinafter for production of coating compositions for wood.

The present invention also relates to the use of the polymer powders described here and hereinafter for production of adhesives, sealants, synthetic renders, papercoating slips, fiber webs, paints and coatings compositions for organic substrates, and for modification of mineral binders.

DETAILED DESCRIPTION OF THE INVENTION

Here and hereinafter, the prefixes $C_n$-$C_m$ used in connection with compounds or molecular moieties each indicate a range for the number of possible carbon atoms that a molecular moiety or a compound can have.

The process of the invention comprises a first step in which an aqueous polymer dispersion S is provided. The polymer in polymer dispersion S is formed essentially from uncharged, monoethylenically unsaturated monomers M0 having a low water solubility of less than 100 g/L, especially not more than 60 g/L and specifically not more than 30 g/L, for example having a water solubility in the range from 0.1 to 60 g/L and specifically in the range from 0.1 to 30 g/L, at 20° C. and 1 bar. The monomers M0 generally make up at least 99% by weight, especially at least 99.9% by weight and specifically 100% by weight of the monomers that constitute the polymer. As well as the monomers M0, the polymer dispersion S may also comprise different mono- or polyethylenically unsaturated monomers in copolymerized form. Examples of these are the monomers MB1 and MB2 elucidated in detail hereinafter.

Examples of monomers M0 are esters of acrylic acid and/or methacrylic acid with alkanols having 1 to 12 carbon atoms such as methyl acrylate, methyl methacrylate, ethyl acrylate, ethyl methacrylate, n-butyl acrylate, n-butyl methacrylate, tert-butyl acrylate, tert-butyl methacrylate, n-hexyl acrylate, octyl acrylate, 2-ethylhexyl acrylate and 2-propylheptyl acrylate;

vinylaromatic hydrocarbons such as styrene;

vinyl esters of saturated $C_2$-$C_{12}$ monocarboxylic acids, such as vinyl acetate, vinyl propionate, vinyl hexanoate, vinyl octanoate and vinyl esters of Versatic acids, and mixtures thereof.

Preferred monomers M0 are esters of acrylic acid and/or methacrylic acid with alkanols having 1 to 12 carbon atoms, such as methyl acrylate, methyl methacrylate, ethyl acrylate, ethyl methacrylate, n-butyl acrylate, n-butyl methacrylate, tert-butyl acrylate, tert-butyl methacrylate, n-hexyl acrylate, octyl acrylate, 2-ethylhexyl acrylate and 2-propylheptyl acrylate; and vinylaromatic hydrocarbons such as styrene; and mixtures thereof.

Particularly preferred monomers M0 are esters of acrylic acid and/or methacrylic acid with alkanols having 1 to 4 carbon atoms, such as methyl acrylate, methyl methacrylate, ethyl acrylate, ethyl methacrylate, n-butyl acrylate, n-butyl methacrylate, tert-butyl acrylate and tert-butyl methacrylate, and mixtures thereof.

As well as the monomers M0, the polymer dispersion S may also comprise different mono- or polyethylenically unsaturated monomers M0* in copolymerized form. Examples of monomers M0* are the monomers MB1 and MB2 elucidated hereinafter, and the monomers M3. Preferably, the proportion of the monomers M0*, based on the total amount of the monomers M0+M0*, is not more than 1% by weight, especially not more than 0.1% by weight.

In general, polymer dispersions S used are those whose polymers have a glass transition temperature $T_g$ in the range from 0 to 150° C., preferably in the range from 50 to 120° C. The glass transition temperature is determined by the DSC method (differential scanning calorimetry, 20 K/min, midpoint measurement) to DIN 53765:1994-03 or ISO 11357-2, with sample preparation preferably to DIN EN ISO 16805:2005.

According to Fox (T. G. Fox, Bull. Am. Phys. Soc. 1956 [Ser. II] 1, page 123) and according to Ullmann's Encyclopädie der technischen Chemie [Ullmann's Encyclopedia of Industrial Chemistry] (vol. 19, page 18, 4th edition, Verlag Chemie, Weinheim, 1980), the following is a good approximation of the glass transition temperature of no more than lightly crosslinked copolymers:

$$1/Tg = x_1/Tg_1 + x_2/Tg_2 + \ldots x_n/Tg_n,$$

where $x_1, x_2, \ldots x_n$, are the mass fractions of the monomers 1, 2, ... n and $Tg_1, Tg_2, \ldots Tg_n$ are the glass transition temperatures in degrees Kelvin of the polymers synthesized from only one of the monomers 1, 2, ... n at a time. The Tg values for the homopolymers of most monomers are known and listed, for example, in Ullmann's Encyclopedia of Industrial Chemistry, 5th ed., vol. A21, page 169, Verlag Chemie, Weinheim, 1992; further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989.

In the aqueous polymer dispersions S, the dispersed polymers are in the form of polymer particles. The polymer particles typically have a weight-average diameter $D_w$ in the range from 10 nm to 200 nm and especially in the range from 20 nm to 100 nm. Determination of the weight average particle diameters is known to the person skilled in the art and is carried out, for example, by the analytical ultracentrifuge method. In this specification, weight-average particle diameter is understood as meaning the weight-average $D_{w50}$ value determined by the method of analytical centrifugation (cf. S.E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175). Preferably, the polymers in polymer dispersion S have a narrow particle size distribution. More particularly, the ratio of weight-average particle diameter $D_{w50}$ to number-average particle diameter $D_{N50}$, i.e. the quotient $D_{w50}/D_{N50}$, will not exceed a value of 2.0, preferably 1.5 and especially 1.2 or 1.1, where both $D_{w50}$ and $D_{N50}$ are determined by the analytical ultracentrifuge method.

The aqueous polymer dispersion S generally comprises one or more dispersants for stabilization of the polymer particles. These particularly include the anionic and nonionic dispersants D1a, D1b and D1c specified hereinafter in connection with the dispersant compositions D1 and D2, especially the anionic emulsifiers D1a having sulfonic acid and or sulfonate groups, especially the alkali metal salts thereof. The content of dispersants in the polymer dispersion S is typically in the range from 1% to 10% by weight, based on the total amount of the dispersed polymer present in the polymer dispersion, or on the total amount of the monomers M0 and any M0*.

The aqueous polymer dispersion S is typically used in such an amount that the proportion by weight of monomers M0, based on the total mass of monomers M0 and the monomers in monomer compositions M1 and M2, is in the range from 0.1% to 10% by weight and especially in the range from 0.5% to 5% by weight.

The polymer dispersions S are typically aqueous emulsion polymers, i.e. aqueous dispersions of polymers which are prepared by a free-radically initiated aqueous emulsion polymerization of the monomers M0 and optionally M0* in the presence of at least one dispersant, for example in the presence of at least one anionic and/or nonionic emulsifier. The polymerization conditions required for the preparation, such as pressure and temperature, are familiar to those skilled in the art and correspond essentially to the conditions specified for steps ii) and iii). The same applies to the polymerization initiators used. The procedure is preferably to initially charge at least a portion or the entire amount of the dispersant present in the polymer dispersion S and then to polymerize the monomers M0 and optionally M0* by the method of free-radical aqueous emulsion polymerization.

The polymer dispersion S can be produced in a separate step. However, the procedure will preferably be to produce the emulsion polymerization S in step i) by free-radically initiated aqueous emulsion polymerization of the ethylenically unsaturated monomers M0 and optionally M0* in the presence of at least one dispersant, for example in the presence of at least one anionic and/or nonionic emulsifier, especially in the presence of at least one anionic emulsifier having sulfonic acid and/or sulfonate groups, and of at least one polymerization initiator, and then to conduct steps ii) and iii) in the polymer dispersion S thus produced.

In step ii) of the process of the invention, the free-radical emulsion polymerization of the monomer composition M1 is effected, comprising 90% to 99.9% by weight, especially 95% to 99.9% by weight and particularly 97% to 99.9% by weight of monomers MA1 and 0.1% to 10% by weight, especially 0.1% to 5% by weight and specifically 0.1% to 3% by weight of monomers MB1, where the stated amounts of monomers MA1 and MB1 are each based on the total weight of the monomers present in the monomer composition M1.

The monomers MA1 have a polymerizable, ethylenically unsaturated double bond and a water solubility of less than 100 g/L, especially not more than 60 g/L and specifically not more than 30 g/L, for example a water solubility in the range from 0.1 to 60 g/L and specifically in the range from 0.1 to 30 g/L, at 20° C. and 1 bar.

Examples of monomers MA1 are
  esters of monoethylenically unsaturated $C_3$-$C_8$ monocarboxylic acids with $C_1$-$C_{30}$-alkanols having 1 to 12 carbon atoms, such as methyl acrylate, methyl methacrylate, ethyl acrylate, ethyl methacrylate, n-butyl acrylate, n-butyl methacrylate, tert-butyl acrylate, tert-butyl methacrylate, n-hexyl acrylate, octyl acrylate, 2-ethylhexyl acrylate and 2-propylheptyl acrylate;
  esters of monoethylenically unsaturated $C_4$-$C_8$ dicarboxylic acids with $C_1$-$C_{30}$-alkanols, such as the diesters of maleic acid and fumaric acid;
  vinylaromatic hydrocarbons such as styrene;
  butadiene;
  olefins and haloolefins, such as ethylene, propene, vinyl chloride and vinylidene chloride;
  vinyl esters and allyl esters of saturated $C_1$-$C_{30}$ monocarboxylic acids, such as vinyl acetate, vinyl propionate, vinyl hexanoate, vinyl octanoate and vinyl esters of Versatic acids,
and mixtures thereof.

Preferred monomers MA1 are
  esters of acrylic acid and/or methacrylic acid with alkanols having 1 to 12 carbon atoms, such as methyl acrylate, methyl methacrylate, ethyl acrylate, ethyl methacrylate, n-butyl acrylate, n-butyl methacrylate, tert-butyl acrylate, tert-butyl methacrylate, n-hexyl acrylate, octyl acrylate, 2-ethylhexyl acrylate and 2-propylheptyl acrylate; and
  vinylaromatic hydrocarbons such as styrene;
and mixtures thereof.

Particularly preferred monomers MA1 are
  esters of acrylic acid with alkanols having 1 to 12 carbon atoms and esters of methacrylic acid with alkanols having 1 to 4 carbon atoms, such as methyl acrylate, methyl methacrylate, ethyl acrylate, ethyl methacrylate, n-butyl acrylate, n-butyl methacrylate, tert-butyl acrylate and tert-butyl methacrylate, and mixtures thereof, especially mixtures of at least one ester of acrylic acid with alkanols having 1 to 12 carbon atoms with at least one ester of methacrylic acid with alkanols having 1 to 4 carbon atoms.

The monomers MB1 have a polymerizable, ethylenically unsaturated double bond and a water solubility of at least 200 g/L or are fully water-miscible.

Examples of monomers MB1 are
monoethylenically unsaturated monocarboxylic acids having 3 to 8 carbon atoms, such as acrylic acid and methacrylic acid;
monoethylenically unsaturated dicarboxylic acids having 4 to 8 carbon atoms, such as maleic acid, itaconic acid and citraconic acid;
primary amides of monoethylenically unsaturated monocarboxylic acids having 3 to 8 carbon atoms, such as acrylamide and methacrylamide;
monoethylenically unsaturated monomers bearing urea or keto groups, such as 2-(2-oxo-imidazolidin-1-yl)ethyl (meth)acrylate, 2-ureido (meth)acrylate, N-[2-(2-oxooxazolidin-3-yl)ethyl] methacrylate, acetoacetoxyethyl acrylate, acetoacetoxy-propyl methacrylate, acetoacetoxybutyl methacrylate, 2-(acetoacetoxy) ethyl methacrylate, diacetoneacrylamide (DAAM) and diacetonemethacrylamide;
monoethylenically unsaturated sulfonic acids and salts thereof, such as vinyl-sulfonic acid, allylsulfonic acid, sulfoethyl acrylate, sulfoethyl methacrylate, sulfo-propyl acrylate, sulfopropyl methacrylate, 2-hydroxy-3-acryloyloxypropylsulfonic acid, 2-hydroxy-3-methacryloyloxypropylsulfonic acid, styrenesulfonic acids and 2-acrylamido-2-methylpropanesulfonic acid, especially salts thereof, specifically the sodium salts thereof;
monoethylenically unsaturated monomers having a phosphate or phosphonate group and salts thereof, such as vinylphosphonic acid, allylphosphonic acid, 2-phosphonoethyl acrylate, 2-phosphonoethyl methacrylate, phosphonopropyl acrylate, phosphonopropyl methacrylate, styrenephosphonic acids, 2-acrylamido-2-methylpropanephosphonic acid, and phosphoric monoesters of the hydroxy-$C_2$-$C_4$-alkyl esters of monoethylenically unsaturated $C_3$-$C_8$ monocarboxylic acids specified hereinafter, for example the phosphoric monoesters of 2-hydroxyethyl (meth)acrylate, 3-hydroxypropyl (meth)acrylate, 4-hydroxybutyl (meth) acrylate, and especially the salts of the aforementioned monoethylenically unsaturated monomers having a phosphate or phosphonate group, specifically the sodium salts thereof;
hydroxy-$C_2$-$C_4$-alkyl esters of monoethylenically unsaturated $C_3$-$C_8$ monocarboxylic acids, especially hydroxy-$C_2$-$C_4$-alkyl esters, or acrylic acid or of methacrylic acid, also referred to hereinafter as hydroxyalkyl (meth)acrylates, especially 2-hydroxyethyl (meth)acrylate, 3-hydroxypropyl (meth)acrylate, '4-hydroxybutyl (meth)acrylate, etc.;
and mixtures thereof.

Preferred monomers MB1 are
monoethylenically unsaturated monocarboxylic acids having 3 to 8 carbon atoms, such as acrylic acid and methacrylic acid;
primary amides of monoethylenically unsaturated monocarboxylic acids having 3 to 8 carbon atoms, such as acrylamide and methacrylamide;
monoethylenically unsaturated monomers bearing urea or keto groups, such as 2-(2-oxo-imidazolidin-1-yl)ethyl (meth)acrylate, 2-ureido (meth)acrylate, N-[2-(2-oxooxazolidin-3-yl)ethyl] methacrylate, acetoacetoxyethyl acrylate, acetoacetoxy-propyl methacrylate, acetoacetoxybutyl methacrylate, 2-(acetoacetoxy)ethyl methacrylate, diacetoneacrylamide (DAAM) and diacetonemethacrylamide;
and mixtures thereof.

The monomers M1 are preferably selected such that the theoretical glass transition temperature of the resulting polymers according to Fox, $T_g(1)$ hereinafter, does not exceed a value of 30° C., especially 20° C., and is, for example, within the range from −40° C. to +30° C. and especially in the range from −20° C. to +20° C.

The amount of the monomers M1 used in the polymerization stage ii) is generally in the range from 50% to 98.9% by weight, preferably in the range from 60% to 95% by weight, especially in the range from 70% to 90% by weight, based on the total mass of the monomers M0 and the monomers of monomer compositions M1 and M2.

The monomer composition M1 is polymerized in the presence of a dispersant composition D1. This comprises at least one first dispersant D1a having at least one sulfate or sulfonate group.

The dispersant D1a may comprise protective colloids having sulfate or sulfonate groups or preferably emulsifiers having sulfate or sulfonate groups. Protective colloids, as opposed to emulsifiers, are understood to mean compounds having molecular weights above 2000 daltons, whereas emulsifiers typically have lower molecular weights. The dispersants D1a having sulfate or sulfonate groups are typically used in the form of their alkali metal salts, especially of their sodium salts or in the form of their ammonium salts.

Suitable dispersants D1a are, for example, the salts, especially the alkali metal and ammonium salts, of alkyl sulfates, especially of $C_8$-$C_{22}$-alkyl sulfates, of sulfuric monoesters of ethoxylated alkanols, especially of sulfuric monoesters of ethoxylated $C_8$-$C_{22}$-alkanols, preferably having an ethoxylation level (EO level) in the range from 2 to 40, of sulfuric monoesters of ethoxylated alkylphenols, especially of sulfuric monoesters of ethoxylated $C_4$-$C_{18}$-alkylphenols (EO level preferably 3 to 40), of alkylsulfonic acids, especially of $C_8$-$C_{22}$-alkylsulfonic acids, of dialkyl esters, especially di-$C_4$-$C_{18}$-alkyl esters of sulfosuccinic acid, of alkylbenzenesulfonic acids, especially of $C_4$-$C_{22}$-alkylbenzenesulfonic acids, and of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company). Also suitable are mixtures of the aforementioned salts.

Preferred dispersants D1a are the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, of sulfuric monoesters of ethoxylated alkylphenols, especially of sulfuric monoesters of ethoxylated $C_4$-$C_{18}$-alkylphenols (EO level preferably 3 to 40), of alkylbenzenesulfonic acids, especially of $C_4$-$C_{22}$-alkylbenzenesulfonic acids, and of mono- or disulfonated, alkyl-substituted diphenyl ethers, for example of bis(phenylsulfonic acid) ethers bearing a $C_4$-$C_{24}$-alkyl group on one or both aromatic rings, and mixtures thereof.

Further suitable anionic emulsifiers can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208.

The dispersant composition D1 further comprises at least one second dispersant D1b having at least one phosphate or phosphonate group, where the phosphate or phosphonate group may be in the acid form or in the salt form, for example in the form of an alkali metal or ammonium salt thereof.

Suitable dispersants D1b are, for example, mono- and dialkyl phosphates, especially $C_8$-$C_{22}$-alkyl phosphates, phosphoric monoesters of C2-C3-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20, phosphoric monoesters of ethoxylated alkylphenols, especially phosphoric monoesters of ethoxylated $C_4$-$C_{18}$-alkylphenols (EO level preferably 3 to 40), alkylphosphonic acids, especially $C_8$-$C_{22}$-alkylphosphonic acids and alkylbenzenephosphonic acids, especially $C_4$-$C_{22}$-alkylbenzenephosphonic acids. Also suitable are salts of the aforementioned dispersants D1b, especially the alkali metal and ammonium salts thereof. Also suitable are the aforementioned dispersants D1b, including mixtures of the aforementioned salts.

Preferred dispersants D1b are phosphoric monoesters of ethoxylated alkanols, especially phosphoric monoesters of ethoxylated $C_8$-$C_{22}$-alkanols, preferably having an ethoxylation level (EO level) in the range from 2 to 30, and phosphoric monoesters of ethoxylated alkylphenols, especially phosphoric monoesters of ethoxylated $C_4$-$C_{18}$-alkylphenols (EO level preferably 2 to 20), phosphoric monoesters of ethoxylated-co-propoxylated $C_8$-$C_{22}$-alkanols, preferably having an ethoxylation level (EO level) in the range from 2 to 20 and a propoxylation level of 1 to 10, and the salts of the aforementioned phosphoric monoesters, especially the alkali metal salts thereof.

Particularly preferred dispersants D1b are phosphoric monoesters of ethoxylated-co-propoxylated $C_8$-$C_{22}$-alkanols, preferably having an ethoxylation level (EO level) in the range from 2 to 20 and a propoxylation level of 1 to 10.

With regard to the dispersants D1a and D1b and likewise with respect to the dispersants D2a and D2b, the alkali metal salts are understood to mean particularly the sodium and potassium salts. Ammonium salts are understood particularly to mean the salts bearing $NH_4^+$ as counterion.

Preferably, the dispersant composition comprises the dispersants D1a and D1b in a weight ratio of D1a to D1b in the range from 1:100 to 2:1, especially in the range from 1:50 to 1.5:1.

As well as the aforementioned dispersants D1a and D1b, the dispersant composition may also comprise one or more nonionic surface-active substances (=nonionic dispersants D1c), which are especially selected from nonionic emulsifiers. Usable nonionic emulsifiers are araliphatic or aliphatic nonionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are the EO/PO block copolymers. Preference is given to ethoxylates of long-chain alkanols (alkyl radical $C_1$-$C_{30}$, mean ethoxylation level 5 to 100) and, among these, particular preference to those having a linear $C_{12}$-$C_{20}$ alkyl radical and a mean ethoxylation level of 10 to 50, and also to ethoxylated monoalkylphenols.

Preferably, the dispersant composition M1 comprises less than 20% by weight, especially not more than 10% by weight, of nonionic dispersants D1c, based on the total amount of the dispersants D1a and D1b, and especially does not comprise any nonionic dispersants D1c.

Preferably, the dispersant composition D1 will be used in such an amount that the amount of dispersant in the dispersant composition D1 is in the range from 0.2% to 5% by weight, especially in the range from 0.5% to 3% by weight, based on the monomers in the monomer composition M1.

In step iii) of the process of the invention, the free-radical emulsion polymerization of the monomer composition M2 is effected, comprising 90% to 99.9% by weight, especially 90% to 99% by weight and particularly 90% to 98% by weight of monomers MA2 and 0.1% to 10% by weight, especially 1% to 10% by weight and specifically 2% to 10% by weight of monomers MB2, where the stated amounts of monomers MA2 and MB2 are each based on the total weight of the monomers present in the monomer composition M2.

Examples of monomers MA2 are the monomers specified as monomers MA1. Preferred monomers MA2 are the monomers specified as preferred in connection with the monomers MA1.

Particularly preferred monomers MA2 are
esters of methacrylic acid with alkanols having 1 to 4 carbon atoms, such as methyl methacrylate, ethyl methacrylate, n-butyl methacrylate and tert-butyl methacrylate, and mixtures thereof with esters of acrylic acid with alkanols having 1 to 4 carbon atoms, especially with tert-butyl acrylate.

The monomers MB1 have a polymerizable, ethylenically unsaturated double bond and a water solubility of at least 200 g/L or are fully water-miscible.

Examples of monomers MB2 are the monomers specified as monomers MB1. Preferred monomers MB2 are the monomers specified as preferred in connection with the monomers MB1.

Particularly preferred monomers MB2 are
monoethylenically unsaturated monocarboxylic acids having 3 to 8 carbon atoms, such as acrylic acid and methacrylic acid;
primary amides of monoethylenically unsaturated monocarboxylic acids having 3 to 8 carbon atoms, such as acrylamide and methacrylamide;
and mixtures thereof.

The monomers M2 are preferably selected such that the theoretical glass transition temperature of the resulting polymer according to Fox, $T_g(2)$ hereinafter, is at least 30 K, especially at least 50 K, for example 20 K to 190 K, especially 50 K to 140 K, above $T_g(1)$. Preferably, $T_g(2)$ has a value of at least 50° C., especially at least 70° C., and is, for example, in the range from 50° C. to 150° C. and especially in the range from 70° C. to 120° C.

The amount of the monomers M1 used in the polymerization stage iii) is generally in the range from 1% to 49.9% by weight, preferably in the range from 4.5% to 39.5% by weight, especially in the range from 9.5% to 29.5% by weight, based on the total mass of the monomers M0 and the monomers of monomer compositions M1 and M2.

The monomer composition M2 is polymerized in the presence of a dispersant composition D2. The latter comprises at least one first dispersant D2b having at least one phosphate or phosphonate group, where the phosphate or phosphonate group may be in the acid form or in the salt form, for example in the form of an alkali metal and ammonium salts thereof.

In addition, the dispersant composition D2 may further comprise one or more further dispersants D2a having at least one sulfate or sulfonate group and optionally also one or more nonionic dispersants D2c.

Useful dispersants D2b are in principle the dispersants specified as dispersants D1b. Suitable dispersants D2b are, for example, mono- and dialkyl phosphates, especially $C_8$-$C_{22}$-alkyl phosphates, phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20, phosphoric monoesters of ethoxylated alkylphenols, especially phosphoric monoesters of ethoxylated $C_4$-$C_{18}$-alkylphenols (EO level preferably 3 to 40), alkylphosphonic acids, especially $C_8$-$C_{22}$-alkylphosphonic acids and alkylbenzenephosphonic acids, especially $C_4$-$C_{22}$-alkylbenzenephosphonic acids. Also suitable are salts of the aforementioned dispersants D2b, especially the alkali metal and ammonium salts thereof. Also suitable are the aforementioned dispersants D2b, including mixtures of the aforementioned salts.

Preferred dispersants D2b are phosphoric monoesters of ethoxylated alkanols, especially phosphoric monoesters of ethoxylated $C_8$-$C_{22}$-alkanols, preferably having an ethoxylation level (EO level) in the range from 2 to 30, and phosphoric monoesters of ethoxylated alkylphenols, especially phosphoric monoesters of ethoxylated $C_4$-$C_{18}$-alkylphenols (EO level preferably 2 to 20), phosphoric monoesters of ethoxylated-co-propoxylated $C_8$-$C_{22}$-alkanols, preferably having an ethoxylation level (EO level) in the range from 2 to 20 and a propoxylation level of 1 to 10, and the salts of the aforementioned phosphoric monoesters, especially the alkali metal salts thereof.

Particularly preferred dispersants D2b are phosphoric monoesters of ethoxylated-co-propoxylated $C_8$-$C_{22}$-alkanols, preferably having an ethoxylation level (EO level) in the range from 2 to 20 and a propoxylation level of 1 to 10.

Useful dispersants D2a are in principle the dispersants specified as dispersants D1a. Preferred dispersants D2a are the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, of sulfuric monoesters of ethoxylated alkylphenols, especially of sulfuric monoesters of ethoxylated $C_4$-$C_{18}$-alkylphenols (EO level preferably 3 to 40), of alkylbenzenesulfonic acids, especially of $C_4$-$C_{22}$-alkylbenzenesulfonic acids, and of mono- or disulfonated, alkyl-substituted diphenyl ethers, for example of bis(phenylsulfonic acid) ethers bearing a $C_4$-$C_{24}$-alkyl group on one or both aromatic rings, and mixtures thereof.

Preferably, the dispersant composition comprises the dispersants D2a and D2b in a weight ratio of D2a to D2b in the range from 0 to 1:2, especially in the range from 0 to 1:5. More particularly, the dispersant composition 2 comprises not more than 10% by weight of dispersants D2a, based on the total amount of the dispersants D2a and D2b, and especially does not comprise any dispersants D2a.

As well as the aforementioned dispersants D2b and any D2a, the dispersant composition may also comprise one or more nonionic surface-active substances (=nonionic dispersants D2c), which are especially selected from nonionic emulsifiers. Usable nonionic dispersants D2c are the nonionic emulsifiers mentioned in connection with the nonionic dispersants D1c.

Preferably, the dispersant composition M2 comprises less than 20% by weight, especially not more than 10% by weight, of nonionic dispersants D2c, based on the total amount of the dispersants D2a and D2b, and especially does not comprise any nonionic dispersants D2c.

Preferably, the dispersant composition D2 will be used in such an amount that the amount of dispersant in the dispersant composition D2 is in the range from 2% to 15% by weight, especially in the range from 3.5% to 10% by weight, based on the monomers in the monomer composition M2.

For the properties of the polymer dispersions of the invention, it has been found to be advantageous when the weight ratio (1) of the dispersants present in the dispersant composition D1 to the monomers of monomer composition M1 is less than the weight ratio (2) of the dispersants present in the dispersant composition D1 to the monomers of monomer composition M2, i.e. when the quotient of weight ratio (1) to weight ratio (2) is less than 1 and especially in the range from 1:1.5 to 1:10.

It has additionally been found to be advantageous for the properties of the polymer dispersions of the invention when the amount of dispersant in the dispersant composition D1 is in the range from 0.5% to 3% by weight, based on the monomers in the monomer composition M1, and the amount of dispersant in the dispersant composition D2 is in the range from 3.5% to 10% by weight, based on the monomers in the monomer composition M2.

According to the invention, the aqueous polymer dispersion is prepared by successive emulsion polymerization of monomer compositions M1 and M2, by subjecting monomer composition M1 to a free-radical emulsion polymerization in the presence of the polymer dispersion S or in the polymer dispersion S and then subjecting monomer composition M2 to a free-radical polymerization in the polymer dispersion thus obtained.

In preferred embodiments of the process of the invention, the procedure will be to prepare the polymer dispersion in situ, meaning that the monomers M0 and optionally M0* are subjected to a free radical aqueous emulsion polymerization, i.e. the ethylenically unsaturated monomers M0 and optionally M0* are polymerized in the presence of at least one dispersant and at least one polymerization initiator by the method of free-radical emulsion polymerization and then steps ii) and iii) are conducted in the polymer dispersion S thus produced.

The conditions required for the performance of the free-radical emulsion polymerization of the monomers M0 and the monomer compositions M1 and M2 are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 if. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of Synthetic High Polymers], F. Hölscher, Springer-Verlag, Berlin (1969)].

The free-radically initiated aqueous emulsion polymerization is triggered by means of a free-radical polymerization initiator (free-radical initiator). These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2"-azobis(isobutyronitrile), 2,2"-azobis(2,4-dimethylvaleronitrile) and 2,2"-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers in the respective polymerization stage, is 0.01% to 5% by weight, preferably 0.1% to 3% by weight and especially preferably 0.2% to 1.5% by weight.

The amount of free-radical initiator required in the process of the invention for the emulsion polymerization in steps ii) and iii) can be initially charged in the polymerization vessel in full. However, it is advantageous to initially charge none of or merely a portion of the free-radical initiator, preferably not more than 30% by weight, especially not more than 20% by weight, based on the total amount of the free-radical initiator required in steps ii) and iii), in the aqueous polymerization medium prior to the initiation of the polymerization reaction in polymerization stage ii), and then, under polymerization conditions during the free-radical emulsion polymerization of the invention in polymerization stage ii) and polymerization stage iii), to add the entire amount or any remaining residual amount, according to the consumption, batchwise in one or more portions or continuously with constant or varying flow rates.

Initiation of the polymerization reaction is understood to mean the start of the polymerization reaction of the monomers present in the aqueous polymerization medium after the free-radical initiator has formed free radicals. The polymerization reaction can be initiated by addition of free-radical initiator to the aqueous polymerization medium in the polymerization vessel under polymerization conditions. Alternatively, it is possible to initially charge the monomers M1 in polymerization vessel, to add a portion or the entirety of the free-radical initiator to the polymerization vessel in polymerization stage ii) under conditions which are not suitable for triggering a polymerization reaction, for example at low temperature, and then to establish polymerization conditions in the aqueous polymerization medium. Polymerization conditions are generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

More particularly, it has been found to be useful to initially charge a portion of the free-radical initiator, preferably not more than 30% by weight, especially not more than 20% by weight, based on the total amount of the polymerization initiator required for polymerization stages ii) and iii).

For the polymerization in step ii), the monomers M1 can be initially charged entirely in the reaction vessel or be fed in over the course of polymerization. More particularly, it has been found to be useful to add the majority of the monomers M1, especially at least 80% by weight, or the entirety of the monomers M1 to the polymerization vessel under polymerization conditions. Preferably, the monomers M1 are added over a period of at least 30 minutes, especially over a period of 0.5 to 10 h and particularly over a period of 1 to 5 h. The monomers M1 can be added in substance or preferably in the form of an aqueous emulsion. Preferably, the monomers M1 are added continuously at constant flow rates. Preferably, the entirety of the monomers M1 is metered in as a monomer mixture of the monomers MA1 and MB1, especially advantageously in the form of an aqueous monomer emulsion. An essential feature is that the invention shall also encompass process variants in which, in polymerization stage ii), the compositions of the monomer composition M1 change, for example in a gradient or staged mode familiar to the person skilled in the art. In preferred embodiments, during the polymerization stage ii) proceeds without any change in the monomer composition M1.

Polymerization stage iii) is conducted after polymerization stage ii). The period between the end of polymerization stage ii) and the commencement of the polymerization of the monomers M2 may be a few minutes to a few hours. The temperature may be lowered below the temperature required for the polymerization of the monomers M1 and M2. Preferably, however, the polymerization of the monomers M2 in step iii) follows directly on from the polymerization of the monomers M1 in step ii). Preferably, the polymerization conditions in step ii) are chosen such that the monomers M1 are converted in polymerization stage ii), prior to the addition of the monomers M2, up to a conversion of ≥95% by weight, advantageously ≥98% by weight.

For the polymerization in step iii), the monomers M2, after step ii) has ended, can be initially charged entirely in the reaction vessel or be fed in over the course of polymerization. More particularly, it has been found to be useful to add the majority of the monomers M2, especially at least 80% by weight, or the entirety of the monomers M2 to the polymerization vessel under polymerization conditions. Preferably, the monomers M2 are added over a period of at least 10 minutes, especially over a period of 20 min to 50 h and particularly over a period of 0.5 to 2 h. The monomers M2 can be added in substance or preferably in the form of an aqueous emulsion. Preferably, the monomers M2 are added continuously at constant flow rates. Preferably, the entirety of the monomers M2 is metered in as a monomer mixture of the monomers MA2 and MB2, especially advantageously in the form of an aqueous monomer emulsion. An essential feature is that the invention shall also encompass process variants in which, in polymerization stage iii), the compositions of the monomer composition M2 change, for example in a gradient or staged mode familiar to the person skilled in the art. In preferred embodiments, there is no change in the monomer composition M2 during the polymerization stage iii).

The free-radical aqueous emulsion polymerization of the invention can be conducted at temperatures in the range from 0 to 170° C. Temperatures employed are generally 50 to 120° C., frequently 60 to 120° C. and often 70 to 110° C. The free-radical aqueous emulsion polymerization of the invention can be conducted at a pressure of less than, equal to or greater than 1 atm (atmospheric pressure), and so the polymerization temperature may exceed 100° C. and may be up to 170° C. Preference is given to polymerizing volatile monomers, for example ethylene, butadiene or vinyl chloride, under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the invention is conducted at 1 atm with exclusion of oxygen, for example under an inert gas atmosphere, for example under nitrogen or argon.

The polymerization in steps ii) and iii) can optionally be conducted in the presence of chain transfer agents. Chain transfer agents are understood to mean compounds that transfer free radicals and which reduce the molecular weight or control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloro-methane, dibromodichloromethane, carbon tetrachloride, carbon tetrabromide, benzyl chloride, benzyl bromide, organic thio compounds such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethyl-butanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecane-thiol and the isomeric compounds thereof, n-dodecanethiol and the isomeric compounds thereof, n-tridecanethiol and isomeric compounds thereof, substituted thiols, for example 2-hydroxyethanethiol, aromatic thiols such as benzenethiol, ortho-, meta- or para-methylbenzenethiol, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes such as acetaldehyde, propionaldehyde and/or benzaldehyde, unsaturated fatty acids such as oleic acid, dienes having nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another. The total amount of chain transfer agents optionally used in the process of the invention, based on the total amount of monomers M1+M2, will generally not exceed 1% by weight.

The emulsion polymerization in step ii) is naturally effected in an aqueous polymerization medium which, as well as water, comprises the polymer of the polymer dispersion S and the surface-active substance of the polymer dispersion S. The emulsion polymerization in step iii) is naturally effected in an aqueous polymerization medium which, as well as water, comprises the polymer from polymerization stage ii) and the surface-active substance of the polymer dispersion S, and also the surface-active substances of the dispersant composition D1. The aqueous reaction medium in polymerization stages ii) and iii) may in principle also comprise minor amounts ($\leq$5% by weight) of water-soluble organic solvents, for example methanol, ethanol, isopropanol, butanols, pentanols, but also acetone, etc. Preferably, however, the process of the invention is conducted in the absence of such solvents.

It is frequently advantageous when the aqueous polymer dispersion obtained on completion of polymerization stage iii) is subjected to an aftertreatment to reduce the residual monomer content. This aftertreatment is effected either chemically, for example by completing the polymerization reaction using a more effective free-radical initiator system (known as postpolymerization), and/or physically, for example by stripping the aqueous polymer dispersion with steam or inert gas. Corresponding chemical and physical methods are familiar to those skilled in the art—see, for example, EP-A 771328, DE-A 19624299, DE-A 19621027, DE-A 19741184, DE-A 19741187, DE-A 19805122, DE-A 19828183, DE-A 19839199, DE-A 19840586 and DE-A 19847115. The combination of chemical and physical aftertreatment has the advantage that it removes not only the unconverted ethylenically unsaturated monomers but also other disruptive volatile organic constituents (VOCs) from the aqueous polymer dispersion.

The polymer particles of the polymer dispersion obtainable by the process of the invention have at least 3 polymer phases P0, P1 and P2, wherein the polymer phase P0 is formed from the monomers M0, the polymer phase P1 from monomers of the monomer composition M1 and a polymer phase P2 from the monomers of the monomer composition M2.

Accordingly, the glass transition temperature of polymer phase P1 preferably has a value of not more than 30° C., especially not more than 20° C., and is, for example, in the range from −40° C. to +30° C. and especially in the range from −20° C. to +20° C.

The glass transition temperature of polymer phase P2 preferably has a value of at least 50° C., especially at least 70° C., and is, for example, in the range from 50° C. to 150° C. and especially in the range from 70° C. to 120° C.

The difference between the glass transition temperature of polymer phase P1 and the glass transition temperature of polymer phase P2 is generally at least 30 K, especially at least 50 K, for example 20 to 190 K, especially 50 to 140 K.

The glass transition temperature is determined by the DSC method (differential scanning calorimetry, 20 K/min, midpoint measurement) to DIN 53765:1994-03 or ISO 11357-2, with sample preparation preferably to DIN EN ISO 16805:2005.

The aqueous polymer dispersions obtained in accordance with the invention typically have polymer solids contents in the range from 10% to 70% by weight, frequently 20% to 65% by weight and often 30% to 60% by weight, based in each case on the total weight of the aqueous polymer dispersion.

The aqueous polymer dispersions obtainable by the process of the invention comprise polymer particles generally having a weight-average diameter $D_w$ in the range from 30 to 500 nm, especially in the range from 50 to 200 nm and particularly in the range from 50 nm to 150 nm. The determination of the weight-average particle diameters is known to the person skilled in the art and is carried out, for example, via the method of analytical ultracentrifugation. In this specification, weight-average particle diameter is understood as meaning the weight-average $D_{w50}$ value determined by the method of analytical centrifugation (cf. S.E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175).

Aqueous polymer dispersions obtainable by the process of the invention comprise polymer particles generally having a narrow particle size distribution. In the context of this specification, a narrow particle size distribution shall be understood to be one where the ratio of the weight-average particle diameter $D_{w50}$ determined by the analytical ultracentrifuge method and number average particle diameter $D_{N50}$ [$D_{w50}/D_{N50}$] is ≤2.0, preferably ≤1.5 and especially preferably ≤1.2 or ≤1.1.

The aqueous polymer dispersions having narrow particle size distributions and weight-average particle diameters $D_w$≤200 nm, especially having $D_w$≤150 nm, that are obtainable by the process of the invention have a high transparency and are therefore especially suitable as binders in transparent aqueous formulations for wood coatings. Advantages are frequently manifested here, such as a lower demand for thickeners for establishment of a particular viscosity and good and deep coloring in the case that color pigments are used, good penetration capacity of the formulation into the wood surface or good "intensification" of the wood grain. In addition, the aqueous polymer dispersions of the invention have improved filterability compared to corresponding aqueous polymer dispersions that are not in accordance with the invention.

It is of course also possible to use the aqueous polymer dispersions of the invention that are obtainable by the process of the invention as a component in the production of adhesives, sealants, synthetic renders, papercoating slips, fiber webs, paints and coatings compositions for organic substrates, and for modification of mineral binders.

The corresponding polymer powders are also obtainable in a simple manner from the aqueous polymer dispersions of the invention (for example by freeze- or spray-drying). These polymer powders obtainable in accordance with the invention can likewise be used as a component in the production of adhesives, sealants, synthetic renders, papercoating slips, fiber webs, paints and coatings compositions for organic substrates, and for modification of mineral binders.

The aqueous polymer dispersions of the invention can be formulated in pigment-free and pigment-containing coating compositions. In this connection, the term "pigment-containing coating compositions" especially encompasses pigment-containing paints and varnishes. They are preferentially suitable for production of pigment-containing paints comprising at least one pigment, especially at least one white pigment. In a likewise preferential manner, they are suitable for production of varnishes which, in contrast to paints, are transparent to semitransparent and which, unlike paints, comprise only small amounts of pigment, the pigment is preferably being selected from (semi)transparent pigments, for example ultrafine iron oxide. As well as the pigments, the coating compositions may comprise one or more fillers, especially one or more inorganic fillers.

The proportion of the pigments and fillers in coating compositions can be described in a manner known per se via the pigment volume concentration (PVC). The PVC describes the ratio of the volume of pigments ($V_P$) and fillers ($V_F$) relative to the total volume, consisting of the volumes of binder ($V_B$, pigments and fillers in a dried coating film in percent: $PVK=(V_P+V_F)\times 100/(V_P+V_F+V_B)$.

The inventive effects of the polymer dispersion are especially manifested in the case of pigment-containing paints having a PVC of at least 5, especially at least 10. Preferably, the PVC will not exceed a value of 50, especially 40, and is specifically in the range from 10 to 35. However, the inventive effects of the polymer dispersions are also manifested in varnishes which typically have a pigment/filler content below 5% by weight, based on the varnish, and correspondingly have a PVC below 10, especially below 5.

Suitable pigments are, for example, inorganic white pigments such as titanium dioxide, preferably in the rutile form, barium sulfate, zinc oxide, zinc sulfide, basic lead carbonate, antimony trioxide, lithopone (zinc sulfide+barium sulfate), or colored pigments, for example iron oxides, carbon black, graphite, zinc yellow, zinc green, ultramarine, manganese black, antimony black, manganese violet, Prussian blue or Paris green. In addition to the inorganic pigments, the emulsion paints of the invention may also comprise organic color pigments, for example sepia, gamboge, Cassel brown, toluidine red, para red, Hansa yellow, indigo, azo dyes, anthraquinonoid and indigoid dyes, and also dioxazine, quinacridone pigments, phthalocyanine pigments, isoindolinone pigments and metal complex pigments. Also suitable are synthetic white pigments with air inclusions to enhance light scattering, such as the Ropaque® and AQACell® dispersions. Additionally suitable are the Luconyl® brands from BASF SE, for example Luconyl® yellow, Luconyl® brown and Luconyl® red, particularly the transparent versions.

Examples of suitable fillers are aluminosilicates such as feldspars, silicates such as kaolin, talc, mica, magnesite, alkaline earth metal carbonates such as calcium carbonate, for example in the form of calcite or chalk, magnesium carbonate, dolomite, alkaline earth metal sulfates such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers, or do not comprise any fillers. Fillers also include flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

In preferred configurations, the coating compositions are configured as a white pigment-containing coating composition, meaning that they contain at least one white pigment and optionally one or more fillers. More particularly, they comprise titanium dioxide, preferably in the rutile form, as white pigment, optionally in combination with one or more fillers. More preferably, the coating compositions of the invention comprise a white pigment, especially titanium dioxide, preferably in the rutile form, in combination with one or more fillers, for example chalk, talc or mixtures thereof.

The aqueous coating compositions (aqueous paints) of the invention may, as well as the polymer P1, the polymer P2, the pigment and water, comprise further auxiliaries.

The customary auxiliaries include
wetting agents or dispersants,
filming auxiliaries,
thickeners,
leveling agents,
biocides and
defoamers.

Wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates such as sodium 1-hydroxyethane-1,1-diphosphonate, and naphthalenesulfonic salts, especially the sodium salts thereof.

Suitable filming auxiliaries are, for example, Texanol® from Eastman Chemicals and the glycol ethers and esters, commercially available, for example, from BASF SE under the Solvenon® and Lusolvan® names, and from Dow under the Dowanol® trade name. The amount is preferably <10% by weight and more preferably <5% by weight, based on the overall formulation. Formulation is also possible completely without solvents.

Suitable thickeners are, for example, associative thickeners, such as polyurethane thickeners. The amount of the thickener is generally less than 2.5% by weight and more preferably less than 1.5% by weight of thickener, and especially 0.05% to 1% by weight, based on the solids content of the coating composition.

Further formulation pointers for wood paints are described in detail in M. Schwartz and R. Baumstark "Water-based Acrylates for Decorative Coatings", Curt R. Vincentz Verlag, Hanover, 2001, p. 191-212 (ISBN 3-87870-726-6).

The coating compositions are produced in a manner known per se by blending the components in mixing apparatuses customary for the purpose. It has been found to be useful to prepare an aqueous paste or dispersion from the pigments, water and any auxiliaries and only then to mix the polymeric binder, i.e., generally the aqueous dispersion of the polymer, with the pigment paste or pigment dispersion.

The coating compositions may be applied to substrates in a customary manner, for example by painting, spraying, dipping, rolling, bar coating.

The aqueous coating compositions are advantageously suitable for coating of substrates, especially of wood.

In this case, the coating of substrates is effected in such a way that the substrate is first coated with an aqueous coating formulation of the invention and then the aqueous coating is subjected to a drying step, especially within the temperature range of $\geq -10$ and $\leq 50°$ C., advantageously $\geq 5$ and $\leq 40°$ C. and especially advantageously $\geq 10$ and $\leq 35°$ C.

The invention is to be illustrated by nonlimiting examples which follow.

EXAMPLES

A. Production Examples

1. Analysis

The solids content was determined by drying a defined amount of the aqueous polymer dispersion (about 2 g) to constant weight in an aluminum crucible having an internal diameter of about 5 cm at 120° C. in a drying cabinet (about 2 hours). Two separate measurements were conducted. The value reported in the example is the mean of the two measurements.

The median particle diameter of the polymer particles was determined by dynamic light scattering of an aqueous polymer dispersion diluted with deionized water to 0.005% to 0.01% by weight at 23° C. by means of a High Performance Particle Sizer (HPPS) from Malvern Instruments, England. What is reported is the cumulant $z_{average}$ diameter of the measured autocorrelation function (ISO Standard 13321).

The glass transition temperature was determined by the DSC method (Differential Scanning calorimetry, 20 K/min, midpoint measurement, DIN 53765) by means of a DSC 822 instrument (TA 8000 series) from Mettler-Toledo.

Starting Materials

Emulsifier solution 1: 20% by weight aqueous solution of sodium dodecylbenzenesulfonate Emulsifier solution 2: 45% by weight aqueous solution of a $C_6$-$C_{16}$-alkyl-substituted bis(phenylsulfonic acid)ether (Dowfax® 2A1)

Emulsifier solution 3: phosphoric monoester of an ethoxylated-co-propoxylated $C_{12}$-$C_{16}$ fatty alcohol with 14-18 EO and 4-8 PO.

Urea monomer: 25% by weight solution of N-(2-methacryloyloxyethyl)imidazolin-2-one in methyl methacrylate Comparative Example 1 (Dispersion CD1)

A polymerization vessel equipped with metering units and closed-loop temperature control was initially charged at 20 to 25° C. (room temperature) under a nitrogen atmosphere with 459.7 g of deionized water and 10.5 g of emulsifier solution 1, and heated to 80° C. while stirring. On attainment of this temperature, 35 g of methyl methacrylate and then, while maintaining the temperature, 4.0 g of feed 3 were added and polymerization was effected for 5 minutes. This was followed by continuous addition at constant flow rates, beginning at the same time, of feed 1 within 135 minutes and, in parallel, of the residual amount of feed 3 within 180 minutes. Within the first 10 minutes, the polymerization temperature was increased to 87° C. After feed 1 had ended, feed 2 was started immediately and metered in continuously at a constant flow rate within 45 minutes.

Feed 1 (Emulsion of):

| | |
|---|---|
| 645.4 g | deionized water |
| 2.2 g | emulsifier solution 2 |
| 7.0 g | emulsifier solution 1 |
| 105.0 g | emulsifier solution 3 |
| 16.2 g | a 50% by weight solution of acrylamide |
| 4.9 g | methacrylic acid |
| 54.3 g | urea monomer |
| 353.1 g | methyl methacrylate and |
| 664.6 g | 2-ethylhexyl acrylate |

Feed 2 (Emulsion of):

| | |
|---|---|
| 155.4 g | deionized water |
| 63.0 g | emulsifier solution 3 |
| 16.1 g | methacrylic acid |
| 263.9 g | methyl methacrylate |

Feed 3 (Homogeneous Solution of):

| | |
|---|---|
| 26.0 g | deionized water and |
| 2.0 g | sodium peroxodisulfate |

Feed 4 (Homogeneous Solution of):

| | |
|---|---|
| 23.7 g | deionized water and |
| 0.3 g | sodium peroxodisulfate |

After feeds 2 and 3 had ended, the polymerization mixture was left to react at 87° C. for another 15 minutes. Thereafter, feed 4 was metered in within 15 min, and the mixture was cooled to 80° C. and stirred at this temperature for another 1.25 h. The neutralization was effected with 8.96 g of a 25% by weight aqueous ammonia solution, then the resultant aqueous polymer dispersion was cooled to room temperature and filtered through a 125 μm filter.

The resultant 2917.3 g of the aqueous polymer dispersion had a solids content of 47.6% by weight and a pH of 8.0. The aqueous polymer dispersion diluted with deionized water had a median particle diameter of 123 nm, determined by means of dynamic light scattering.

Comparative Example 2 (Dispersion CD2)

Dispersion CD2 was produced by the method specified for comparative example 1 with a different composition in feed 1 and feed 2:

Feed 1 (Emulsion of):

| | |
|---|---|
| 641.2 g | deionized water |
| 2.2 g | emulsifier solution 2 |
| 14.0 g | emulsifier solution 1 |
| 84.0 g | emulsifier solution 3 |
| 16.2 g | a 50% by weight solution of acrylamide |
| 4.9 g | methacrylic acid |
| 54.3 g | urea monomer |
| 353.1 g | methyl methacrylate and |
| 664.6 g | 2-ethylhexyl acrylate |

Feed 2 (Emulsion of):

| | |
|---|---|
| 155.4 g | deionized water |
| 84.0 g | emulsifier solution 3 |
| 16.1 g | methacrylic acid |
| 263.9 g | methyl methacrylate |

The resultant 2920 g of the aqueous polymer dispersion had a solids content of 47.8% by weight and a pH of 8.1. The aqueous polymer dispersion diluted with deionized water had a median particle diameter of 125 nm, determined by means of dynamic light scattering.

Comparative Example 3 (Dispersion CD3)

A polymerization vessel equipped with metering units and closed-loop temperature control was initially charged at 20 to 25° C. (room temperature) under a nitrogen atmosphere with 470.7 g of deionized water and 42 g of emulsifier solution 1, and heated to 87° C. while stirring. On attainment of this temperature, 56.34 g of feed 1 and then, while maintaining the temperature, 4.0 g of feed 3 were added and polymerization was effected for 5 minutes. This was followed by continuous addition at constant flow rates, beginning at the same time, of the residual amounts of feed 1 within 135 minutes and, in parallel, of the residual amount of feed 3 within 210 minutes. Immediately after feed 1 had ended, feed 2 was started and metered in continuously at a constant flow rate within 75 minutes.

Feed 1 (Emulsion of):

| | |
|---|---|
| 661.1 g | deionized water |
| 59.5 g | emulsifier solution 1 |
| 16.8 g | a 50% by weight solution of acrylamide |
| 10.5 g | methacrylic acid |
| 56.0 g | urea monomer |
| 359.1 g | methyl methacrylate and |
| 686.0 g | 2-ethylhexyl acrylate |

Feed 2 (Emulsion of):

| | |
|---|---|
| 184.1 g | deionized water |
| 13.3 g | emulsifier solution 1 |
| 10.5 g | methacrylic acid |
| 269.5 g | methyl methacrylate |

Feed 3 (Homogeneous Solution of):

| | |
|---|---|
| 26.0 g | deionized water and |
| 2.0 g | sodium peroxodisulfate |

Feed 4 (Homogeneous Solution of):

| | |
|---|---|
| 23.7 g | deionized water and |
| 0.3 g | sodium peroxodisulfate |

After feeds 2 and 3 had ended, the polymerization mixture was left to react at 87° C. for another 15 minutes. Thereafter, feed 4 was metered in within 20 min, and the mixture was stirred at this temperature for another 1.25 h. The neutralization was effected with 5.6 g of a 25% by weight aqueous ammonia solution, then the resultant aqueous polymer dispersion was cooled to room temperature and filtered through a 125 μm filter.

The resultant 2896.7 g of the aqueous polymer dispersion had a solids content of 49.1% by weight and a pH of 7.6. The aqueous polymer dispersion diluted with deionized water had a median particle diameter of 97 nm, determined by means of dynamic light scattering.

Example 1 (Dispersion D1)

Dispersion D1 was produced by the method specified for comparative example 1 with a different composition in feed 1 and feed 2:

Feed 1 (Emulsion of):

| | |
|---|---|
| 715.8 g | deionized water |
| 2.2 g | emulsifier solution 2 |
| 34.3 g | emulsifier solution 1 |

| | |
|---|---|
| 35.0 g | emulsifier solution 3 |
| 16.2 g | a 50% by weight solution of acrylamide |
| 4.9 g | methacrylic acid |
| 54.3 g | urea monomer |
| 353.1 g | methyl methacrylate and |
| 664.6 g | 2-ethylhexyl acrylate |

Feed 2 (Emulsion of):

| | |
|---|---|
| 111.7 g | deionized water |
| 133.0 g | emulsifier solution 3 |
| 16.1 g | methacrylic acid |
| 263.9 g | methyl methacrylate |

The resultant 2974.3 g of the aqueous polymer dispersion had a solids content of 47.5% by weight and a pH of 7.8. The aqueous polymer dispersion diluted with deionized water had a median particle diameter of 125 nm, determined by means of dynamic light scattering.

Example 2 (Dispersion D2)

Dispersion D2 was produced by the method specified for comparative example 1 with a different composition in feed 1 and feed 2:
Feed 1 (Emulsion of):

| | |
|---|---|
| 637.7 g | deionized water |
| 2.2 g | emulsifier solution 2 |
| 21.0 g | emulsifier solution 1 |
| 35.0 g | emulsifier solution 3 |
| 59.5 g | a 50% by weight solution of acrylamide |
| 4.9 g | methacrylic acid |
| 54.3 g | urea monomer |
| 353.1 g | methyl methacrylate and |
| 664.6 g | 2-ethylhexyl acrylate |

Feed 2 (Emulsion of):

| | |
|---|---|
| 155.4 g | deionized water |
| 108.5 g | emulsifier solution 3 |
| 16.1 g | methacrylic acid |
| 263.9 g | methyl methacrylate |

The resultant 2922.9 g of the aqueous polymer dispersion had a solids content of 47.8% by weight and a pH of 8.0. The aqueous polymer dispersion diluted with deionized water had a median particle diameter of 128 nm, determined by means of dynamic light scattering.

Example 3 (Dispersion D3)

Dispersion D3 was produced by the method specified for comparative example 1 with a different composition in feed 1 and feed 2:
Feed 1 (Emulsion of):

| | |
|---|---|
| 641.8 g | deionized water |
| 2.2 g | emulsifier solution 2 |
| 14.0 g | emulsifier solution 1 |
| 80.5 g | emulsifier solution 3 |
| 16.2 g | a 50% by weight solution of acrylamide |
| 4.9 g | methacrylic acid |
| 54.3 g | urea monomer |
| 353.1 g | methyl methacrylate and |
| 664.6 g | 2-ethylhexyl acrylate |

Feed 2 (Emulsion of):

| | |
|---|---|
| 155.8 g | deionized water |
| 87.5 g | emulsifier solution 3 |
| 16.1 g | methacrylic acid |
| 263.9 g | methyl methacrylate |

The resultant 2921.1 g of the aqueous polymer dispersion had a solids content of 48.0% by weight and a pH of 7.9. The aqueous polymer dispersion diluted with deionized water had a median particle diameter of 132 nm, determined by means of dynamic light scattering.

Example 4 (Dispersion D4)

Dispersion D4 was produced by the method specified for comparative example 1 with a different composition in feed 1 and feed 2:
Feed 1 (Emulsion of):

| | |
|---|---|
| 637.0 g | deionized water |
| 2.2 g | emulsifier solution 2 |
| 30.1 g | emulsifier solution 1 |
| 67.2 g | emulsifier solution 3 |
| 16.2 g | a 50% by weight solution of acrylamide |
| 4.9 g | methacrylic acid |
| 54.3 g | urea monomer |
| 353.1 g | methyl methacrylate and |
| 664.6 g | 2-ethylhexyl acrylate |

Feed 2 (Emulsion of):

| | |
|---|---|
| 155.4 g | deionized water |
| 67.9 g | emulsifier solution 3 |
| 16.1 g | methacrylic acid |
| 263.9 g | methyl methacrylate |

The resultant 2899.1 g of the aqueous polymer dispersion had a solids content of 47.9% by weight and a pH of 8.2. The aqueous polymer dispersion diluted with deionized water had a median particle diameter of 126 nm, determined by means of dynamic light scattering.

Performance Testing:
Production of a Coating Composition:
The aqueous polymer dispersions were diluted with deionized water to a solids content of 45% by weight. 628 g of each of these dilute aqueous polymer dispersions were produced at room temperature to give a paint formulation having the following composition, by homogenizing the constituents:

| | |
|---|---|
| 60.0 g | deionized water |
| 2.0 g | silicone surfactant[1] |
| 0.6 g | thickener 1 [2] |
| 1.5 g | aqueous 25% by weight ammonia |
| 4.0 g | defoamer 1 [3] |
| 10.0 g | dispersant 1 [4] |
| 1.0 g | thickener 2 [5] |
| 10.0 g | filming auxiliary 1 [6] |
| 10.0 g | filming auxiliary 2 [7] |
| 232.0 g | titanium dioxide pigment [8] |

-continued

| | |
|---|---|
| 35.0 g | calcium carbonate filler [9] |
| 628.0 g | polymer dispersion |
| 3.0 g | defoamer 4 [10] |
| X g | thickener 3 [11] [12] |
| Y g | deionized water [13] |
| 1) | Byk 348 (wetting agent from Byk-Chemie GmbH) |
| 2) | hydrophobically modified acrylate polymer (Rheovis ® HS 1169 from BASF SE) |
| 3) | Byk 020 (polysiloxane from Byk-Chemie GmbH) |
| 4) | sodium salt of a polyacrylic acid (Dispex ® CX 4320 from BASF SE) |
| 5) | polyurethane thickener (Rheovis ® PU 1270 from BASF SE) |
| 6) | Texanol ® |
| 7) | butyldiglycol |
| 8) | Kronos 2190 from Kronos Inc. |
| 9) | Omyacarb 5-GU (from Omya GmbH) |
| 10) | Tego Foamex 825 (alkylpolysiloxane from Evonik Industries AG) |
| 11) | polyurethane thickener (Rheovis ® PU 1331 from BASF SE) |
| 12) | X = 1.4 g for dispersion CD3, 2.7 g for all other dispersions |
| 13) | Y = 1.5 g for dispersion CD3, 0.2 g for all other dispersions |

The following studies were conducted:

Defects in polymer film leveling: For this purpose, the aqueous polymer dispersion was drawn down onto glass as a film having a wet coating thickness of 100 μm. The reflection of a light source on the weight film was assessed qualitatively using German school marks:

0=very good, no defects, 5=very matt, severe defects.

Thickenability: The amount of thickener needed to attain the desired viscosity (about 110 to 115 KU) was ascertained. The viscosity was determined with the aid of a Brookfield KU-1 measuring instrument at 20° C.

Hue stability: The hue stability was determined by means of a rub-out test of the abovementioned formulation which had been tinted with either a red or a blue pigment paste.
   a) Red pigment paste: Avatint RX (red) from Tikkurila—addition of 4% by weight of pigment paste to paint formulation
   b) Blue pigment paste: Luconyl Blue 6900 from BASF SE-addition of 6% by weight of pigment paste to paint formulation Test instrument: Erichsen film applicator 300 μm Test medium: contrast card/reverse side 28 cm*8 cm Procedure: The paint to be tested is applied with the Erichsen film applicator to the reverse side of the contrast card with a wet film thickness of 300 μm. Thereafter, a "finger" is used to rub the drawdown in circles until the color comes off to a noticeable degree. Then a fresh unrubbed color dot is placed in the center of the circle as a contrast.

Evaluation: Visual assessment as ranking 0=no color change to 6=significant color change. In addition, a photospectrometer (Minolta Spectrometer CM-508i) was used to determine the ΔE value as a measure of the respective color deviation. For this purpose, the so-called L, a and b values of the rubbed area and the contrast dot were measured at several points and then the respective mean was formed. Subsequently, the differences in the averaged L, a and b values were ascertained (ΔL, Δa and Δb). The ΔE value is calculated by the following formula:

$$\Delta E = \sqrt{(\Delta L)^2 + (\Delta a)^2 + (\Delta b)^2}$$

The results are compiled in the following tables 1 and 2:

TABLE 1

Leveling defects and thickening

| Dispersion | Leveling defects School mark | Amount of thickener [ppm] | Viscosity KU |
|---|---|---|---|
| D1 | 1 | 2.7 | 101 |
| D2 | 2 | 2.7 | 103 |
| D3 | 1-2 | 2.7 | 105 |
| D4 | 1-2 | 2.7 | 103 |
| CD1 | 5 | 2.7 | 108 |
| CD2 | 4 | 2.7 | 106 |
| CD3 | 4 | 1.4 | 111 |

TABLE 2

(Hue stability)

| | Red tint | | Blue tint | |
|---|---|---|---|---|
| | Qualitative | ΔE (%) | Qualitative | ΔE (%) |
| D1 | 1 | 1.10 | 0-1 | 0.93 |
| D2 | 1-2 | 1.14 | 0-1 | 0.59 |
| D3 | 1 | 1.03 | 2 | 1.16 |
| D4 | 1-2 | 1.13 | 0-1 | 0.95 |
| CD1 | 0-1 | 0.79 | 0-1 | 0.97 |
| CD2 | 1 | 1.00 | 1 | 1.06 |
| CD3 | 3 | 2.32 | 3 | 2.39 |

The invention claimed is:

1. A process for producing an aqueous polymer dispersion by free-radically initiated aqueous emulsion polymerization of ethylenically unsaturated monomers in the presence of at least one dispersant and at least one polymerization initiator, comprising the following steps:
   i) provision of an aqueous polymer dispersion S formed essentially from uncharged, monoethylenically unsaturated monomers M0 having a low water solubility of less than 100 g/l at 20° C. and 1 bar;
   ii) free-radical emulsion polymerization of a monomer composition M1 in the presence of a dispersant composition D1 and the aqueous polymer dispersion S, said monomer composition M1 comprising:
   90% to 99.9% by weight, based on the total amount of monomers in the monomer composition M 1, of at least one uncharged monoethylenically unsaturated monomer MA1 having a water solubility of less than 100 g/L at 20° C. and 1 bar; and
   0.1% to 10% by weight, based on the total amount of monomers in the monomer composition M1, of at least one anionic or uncharged monoethylenically unsaturated monomer MB1 having a water solubility of at least 200 g/L at 20° C. and 1 bar;
   and then
   iii) free-radical emulsion polymerization of a monomer composition M2 in the presence of a dispersant composition D2 in the aqueous polymer dispersion obtained in step ii), said monomer composition M2 comprising:
   90% to 99.9% by weight, based on the total amount of monomers in the monomer composition M2, of at least one uncharged monoethylenically unsaturated monomer MA2 having a water solubility of less than 100 g/L at 20° C. and 1 bar; and
   0.1% to 10% by weight, based on the total amount of monomers in the monomer composition M2, of at least one anionic or uncharged monoethylenically unsaturated monomer MB2 having a water solubility of at least 200 g/L at 20° C. and 1 bar;

wherein the dispersant composition D1 comprises at least one first anionic dispersant D1a having at least one sulfate or sulfonate group, and optionally at least one second dispersant D1b having at least one phosphate or phosphonate group;

wherein the dispersant composition D2 comprises at least one dispersant D2b having at least one phosphate or phosphonate group;

wherein the weight ratio of the amount of dispersant D1b used in stage 1 to the amount of dispersant D2b used in stage 2 is less than 1.

2. The process according to claim 1, wherein the weight ratio of the amount of dispersant D1b used in stage 1 to the amount of dispersant D2b used in stage 2 is in the range from 1:1.01 to 1:5.00.

3. The process according to claim 1, wherein the weight ratio (1) of dispersants in dispersant composition D1 to the monomers in monomer composition M1 is less than the weight ratio (2) of dispersants in the dispersant composition D2 to the monomers in monomer composition M2.

4. The process according to claim 3, wherein the quotient of weight ratio (1) to weight ratio (2) is in the range from 1:1.5 to 1:10.

5. The process according to claim 1, wherein the amount of dispersant in the dispersant composition D1 is in the range from 0.5% to 3% by weight, based on the monomers in the monomer composition M1, and the amount of dispersant in the dispersant composition D2 is in the range from 3.5% to 10% by weight, based on the monomers in the monomer composition M2.

6. The process according to claim 1, wherein the proportion by weight of monomers in monomer composition M1, based on the total mass of monomers M0 and the monomers in monomer compositions M1 and M2, is in the range from 60% to 95% by weight.

7. The process according to claim 1, wherein the proportion by weight of monomers M0, based on the total mass of monomers M0 and the monomers in monomer compositions M1 and M2, is in the range from 0.1% to 10% by weight.

8. The process according to claim 1, wherein the polymer dispersion S is produced in step i) by free-radically initiated aqueous emulsion polymerization of ethylenically unsaturated monomers M0 in the presence of at least one dispersant and of at least one polymerization initiator, and then steps ii) and iii) are conducted in the polymer dispersion S thus produced.

9. The process according to claim 1, wherein the proportion by weight of the monomers MB1, based on the total amount of the monomers in monomer composition M1, is in the range from 0.1% to 3% by weight, and the proportion by weight of the monomers MB2, based on the total amount of the monomers in monomer composition M2, is in the range from 2% to 10% by weight.

10. The process according to claim 1, wherein the monomer composition M1 corresponds to a theoretical glass transition temperature $T_g(1)$ according to Fox of not more than 30° C., and the monomer composition M2 to a theoretical glass transition temperature $T_g(2)$ according to Fox of at least 50° C.

11. The process according to claim 1, wherein the dispersant having at least one phosphate or phosphonate group is selected from the salts of phosphoric monoesters of ethoxylated alkanols, of phosphoric monoesters of ethoxylated-co-propoxylated alcohols and of phosphoric monoesters of ethoxylated alkylphenols.

12. The process according to claim 1, wherein the dispersant having at least one sulfate or sulfonate group is selected from salts of alkylbenzenesulfonates, of sulfuric monoesters of ethoxylated alkanols, of sulfuric monoesters of ethoxylated alkylphenols and of mono- and disulfonated, alkyl-substituted diphenyl ethers.

13. The process according to claim 1, wherein the monomers MA1 and MA2 are selected from esters and diesters of monoethylenically unsaturated $C_3$-$C_8$ monocarboxylic acids and $C_4$-$C_8$ dicarboxylic acids with $C_1$-$C_{30}$-alkanols, esters of vinyl or allyl alcohol with saturated $C_1$-$C_{30}$ monocarboxylic acids and vinylaromatic hydrocarbons and mixtures thereof.

14. The process according to claim 1, wherein the monomers MB1 and MB2 are selected from monoethylenically unsaturated $C_3$-$C_8$ monocarboxylic acids, monoethylenically unsaturated $C_4$-$C_8$ dicarboxylic acids, primary amides of monoethylenically unsaturated $C_3$-$C_8$ monocarboxylic acids, hydroxy-$C_2$-$C_4$-alkyl esters of monoethylenically unsaturated $C_3$-$C_8$ monocarboxylic acids, monoethylenically unsaturated monomers having keto groups, monoethylenically unsaturated monomers having a phosphate or phosphonate group, and monoethylenically unsaturated monomers having urea groups, and mixtures thereof.

15. An aqueous polymer dispersion obtainable by the process according to claim 1, having polymer particles comprising at least 3 polymer phases P0, P1 and P2, wherein the polymer phase P0 is formed from the monomers M0, the polymer phase P1 from monomers of the monomer composition M1 and a polymer phase P2 from the monomers of the monomer composition M2.

16. The aqueous polymer dispersion according to claim 15, having at least one of the following features:
the polymer phase P1 has a glass transition temperature $T_g1$ of less than 30° C. and the polymer phase P2 a glass transition temperature $T_g2$ of at least 50° C., determined by means of dynamic differential calorimetry by the midpoint method to DIN 53765:1994-03;
the polymer particles have a median particle diameter, determined by means of quasielastic light scattering, in the range from 50 nm to 200 nm.

17. A polymer powder obtainable by drying an aqueous polymer dispersion according to claim 15.

* * * * *